US008879793B2

(12) United States Patent
Peterson (10) Patent No.: US 8,879,793 B2
(45) Date of Patent: Nov. 4, 2014

(54) SYNTHETIC APERTURE RADAR MAP APERTURE ANNEALING AND INTERPOLATION

(71) Applicant: Raytheon Company, Waltham, MA (US)

(72) Inventor: Timothy T. Peterson, Culver City, CA (US)

(73) Assignee: Raytheon Company, Waltham, MA (US)

( * ) Notice: Subject to any disclaimer, the term of this patent is extended or adjusted under 35 U.S.C. 154(b) by 99 days.

(21) Appl. No.: 13/771,645

(22) Filed: Feb. 20, 2013

(65) Prior Publication Data

US 2014/0233791 A1    Aug. 21, 2014

(51) Int. Cl.
*G06K 9/00* (2006.01)
*G01S 13/90* (2006.01)
*G06T 5/00* (2006.01)

(52) U.S. Cl.
CPC *G06T 5/001* (2013.01); *G01S 13/90* (2013.01)
USPC .......................................................... 382/103

(58) Field of Classification Search
None
See application file for complete search history.

(56) References Cited

U.S. PATENT DOCUMENTS

| 5,012,249 | A  | * | 4/1991  | Chan .......................... 342/25 A |
| 5,812,082 | A  |   | 9/1998  | Moreira et al. |
| 6,646,593 | B1 | * | 11/2003 | Garren ........................ 342/179 |
| 7,006,031 | B1 | * | 2/2006  | Abatzoglou et al. ........ 342/25 A |
| 7,301,495 | B2 | * | 11/2007 | Abatzoglou et al. ......... 342/25 F |
| 7,515,098 | B1 | * | 4/2009  | Garren et al. ................. 342/179 |
| 8,013,778 | B2 | * | 9/2011  | Grafmueller et al. ....... 342/25 R |
| 8,384,583 | B2 | * | 2/2013  | Leva et al. .................. 342/25 C |
| 2008/0297405 | A1 | * | 12/2008 | Morrison, et al. ........... 342/25 F |
| 2009/0083008 | A1 | * | 3/2009  | Allen et al. ....................... 703/2 |
| 2012/0206293 | A1 | * | 8/2012  | Nguyen et al. .............. 342/25 F |
| 2013/0236115 | A1 | * | 9/2013  | Nguyen et al. ................ 382/260 |

OTHER PUBLICATIONS

Mora, O.; Mallorqui, J.J.; Broquetas, A, "Linear and nonlinear terrain deformation maps from a reduced set of interferometric SAR images," Geoscience and Remote Sensing, IEEE Transactions on , vol. 41, No. 10, pp. 2243,2253, Oct. 2003, doi: 10.1109/TGRS.2003. 814657.*

* cited by examiner

*Primary Examiner* — Tahmina Ansari
(74) *Attorney, Agent, or Firm* — Burns & Levinson LLP; Joseph P. Maraia (57) ABSTRACT

A method for repairing, bridging, or extrapolating an existing aperture to improve image interpretability in synthetic aperture radar images.

11 Claims, 5 Drawing Sheets

SYNTHETIC APERTURE RADAR MAP APERTURE ANNEALING AND INTERPOLATION

BACKGROUND

Synthetic Aperture Radar (SAR) is used for ground mapping as well as target identification. SAR imaging methods combine the amplitude and phase information of radar returns from a sequence of transmitted pulses. These transmitted pulses are from a relatively small antenna on a moving platform. As the platform moves, the information reflected from the sequence of pulses is combined to arrive at a high resolution SAR image.

The plurality of sequential returns creating a SAR image generated by the transmitted pulses along a presumed known path of the platform make up an array. Theoretically, during the array, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the array.

One difficulty presented in SAR imaging occurs when a number of radar pulse returns forming the required sequence of returns in an array may be missing. The missing pulses may arise because of, for example, multi-mode operation wherein a different mode is entered during an array. The missing pulses within the partial array blur the resulting SAR image, obfuscating details thus rendering it of limited utility, necessitating restoration of the missing pulse returns. A second difficulty may occur when portions of radar pulse returns are corrupted due to interference or obstruction of the radar line-of-sight. In either case, the SAR image will benefit through supplying substitute data that minimizes phase discontinuities and allows the existing signals to propagate. In the descriptions and claims herein, "corrupted data" refers to regions of either missing data or data actively corrupted due to interference or obstruction.

SUMMARY

The technology described herein relates to synthetic aperture radar imaging methods and systems that repair, bridge, or extrapolate an existing aperture to improve image interpretability in a synthetic aperture radar image. SAR images are improved by a moving radar generating a complete, uncorrupted synthetic aperture image from an incomplete sequence or corrupted sequence of pulse returns. The improved image is then formed through one or more Fourier transforms of the signal space formed from the pulse returns.

One embodiment is a method for repairing, bridging, or extrapolating an existing aperture to improve image interpretability. The method includes determining a size of a corrupt data region embedded in or adjacent to an existing set of aperture data and identifying a border region of uncorrupted data contiguous with the corrupt data region. The method includes selecting an uncorrupt data region from the set of existing aperture data, disjoint from the border region and the corrupt data region, where the uncorrupt data region is selected to be able to completely overlay the corrupt data region and the border region at multiple translational offsets. The method includes forming an extended basis set of vectors, X, from a one-dimensional mapping of uncorrupted data registered to each point in the border region, for each translational offset. The method includes forming an auxiliary set of vectors, A, from a one-dimensional mapping of uncorrupted data registered to each point in the corrupt data region, for each translational offset. The method includes forming a reduced basis set of vectors, S, either by 1) picking selected translational offsets of the extended basis set, identified by peaks of a conjugate correlation between the uncorrupted data and the border region, or by 2) picking one or more top eigenvectors of a singular value decomposition (SVD) of the extended basis set, as X=UDV', where U is m×m, with m the length of the one-dimensional mapping to each point in the border region, where D is diagonal and m×n, with n the number of translational offsets and m>=n, where V' is the hermitian conjugate of V, an n×n matrix, and U and V are unitary, with the reduced basis set of vectors formed as $S=XV_{top}$, where $V_{top}$ is composed of the columns of V corresponding to the one or more largest diagonal values of D (top eigenvalues), and with the reduced auxiliary set of vectors formed as $S'=AV_{top}$. The method includes solving a linear matrix equation for a linear combination, C, of the reduced basis set, S, which minimizes an L2-norm distance from the border region. The method includes applying the linear combination vector, C, to the reduced auxiliary set of vectors, S', to generate replacement data for replacing the data in the corrupt data region.

In some embodiments, applying the linear combination vector, C, to the reduced auxiliary set of vectors, generates a new data region that best matches the corrupt data region, wherein the step of applying the linear combination vector, C, includes solving a linear matrix equation that minimizes a Euclidean distance at the border region, in accordance with $S^T S \cdot C = S^T \cdot m_{\cap B}$, where S is a matrix of column vectors of the reduced basis set, and $S^T$ is the hermitian conjugate of S, and $m_{\cap B}$ is the one-dimensional mapping of the border region. In some embodiments, the method includes identifying one or more peaks in the conjugate correlation data by finding one or more translational offsets of the data for the uncorrupt data region that have a strong correlation with the border region around the corrupt data region.

In some embodiments, the method includes adding random noise to the replacement data to make the replacement data power level consistent with the border region power level. In some embodiments, the conjugate correlation is performed in accordance with:

$$A(k, l) = \sum_{x=0}^{N-1} \sum_{y=0}^{M-1} M(x, y) \cdot T^*(x, y) \cdot e^{i2\pi k \cdot x/N} \cdot e^{i2\pi l \cdot y/M},$$

where $$M(x, y) = \frac{1}{MN} \sum_{k'=0}^{N-1} \sum_{l'=0}^{M-1} m(k', l') \cdot e^{-i2\pi k' \cdot x/N} \cdot e^{-i2\pi l' \cdot y/M},$$

$$T(x, y) = \sum_{k'=0}^{N-1} \sum_{l'=0}^{M-1} t(k', l') \cdot e^{-i2\pi k' \cdot x/N} \cdot e^{-i2\pi l' \cdot y/M},$$

m(k',l') is the radar return data for the border region, with zeros for the corrupt data region, t(k',l') is the radar return data for the uncorrupt data region, and M and N are dimensions large enough to allow for overlay of the uncorrupt region with the corrupt data region plus the border region at multiple translational offsets.

Another embodiment is a synthetic aperture imaging system. The system includes one or more processors and a memory. The memory includes executable code representing instructions that when executed cause the system to determine a size of a corrupt data region embedded in or adjacent to an existing set of aperture data and identify a border region of uncorrupted data contiguous with the corrupt data region. The memory also includes executable code representing instructions that when executed cause the system to select an uncorrupt data region from the set of existing aperture data, disjoint from the border region and the corrupt data region, where the uncorrupt data region is selected to be able to completely overlay the corrupt data region and the border region at multiple translational offsets. The memory includes executable code representing instructions that when executed cause the system to form an extended basis set of vectors from a one-dimensional mapping of uncorrupted data registered to each point in the border region, for each translational offset. The memory includes executable code representing instructions that when executed cause the system to form an auxiliary set of vectors from a one-dimensional mapping of uncorrupted data registered to each point in the corrupt data region, for each translational offset. The memory includes executable code representing instructions that when executed cause the system to form a reduced basis set of vectors, S, either by 1) picking selected translational offsets of the extended basis set, identified by peaks of a conjugate correlation between the uncorrupted data and the border region, or by 2) picking one or more top eigenvectors of a singular value decomposition (SVD) of the extended basis set. The memory includes executable code representing instructions that when executed cause the system to form a reduced auxiliary set of vectors, S', either by 1) picking the same selected translational offsets as in S, or by 2) applying the same linear combinations, that when applied to the extended basis set vectors, resulted in the one or more top eigenvectors, composing S. The memory includes executable code representing instructions that when executed cause the system to solve a linear matrix equation for a linear combination, C, of the reduced basis set, S, which minimizes an L2-norm distance from the border region. The memory includes executable code representing instructions that when executed cause the system to apply the linear combination vector, C, to the reduced auxiliary set of vectors, S', to generate replacement data for replacing the data in the corrupt data region.

In some embodiments, the memory includes executable code representing instructions that when executed cause the system to solve a linear matrix equation to form a linear combination of the translational degrees of freedom that minimizes a Euclidean distance at the border region to identify which linear combination of the reduced auxiliary set of vectors generates a new data region that best replaces the corrupt data region. In some embodiments, the memory includes executable code representing instructions that when executed cause the system to identify one or more peaks in the conjugate correlation data that identify translational offsets of the uncorrupt data region that have a strong correlation with the border region.

In some embodiments, the memory includes executable code representing instructions that when executed cause the system to perform a singular value decomposition (SVD) of the extended basis set to identify linear combinations of the vectors of the extended basis set, corresponding to eigenvectors with the greatest magnitude eigenvalues. In some embodiments, the memory includes executable code representing instructions that when executed cause the system to add random noise to the replacement data to make the replacement data power level consistent with the border region power level. In some embodiments, the system includes a transmitter to transmit radar signals towards a target and a receiver to receive the radar return signals generated in response to the transmitted radar signals, to form the aperture data with a transform relationship to an image.

The radar imaging methods and systems described herein (hereinafter "technology") can provide one or more of the following advantages. One advantage of the technology is that it bridges missing or corrupted aperture data by using translational degrees of freedom in the other data available. Another advantage of the technology is that replacement data is generated to replace the missing or corrupted aperture data to improve the quality of the SAR image.

BRIEF DESCRIPTION OF THE DRAWINGS

The foregoing features of various embodiments of the invention will be more readily understood by reference to the following detailed descriptions in the accompanying drawings.

DETAILED DESCRIPTION OF ILLUSTRATIVE EMBODIMENTS

Figure 1:
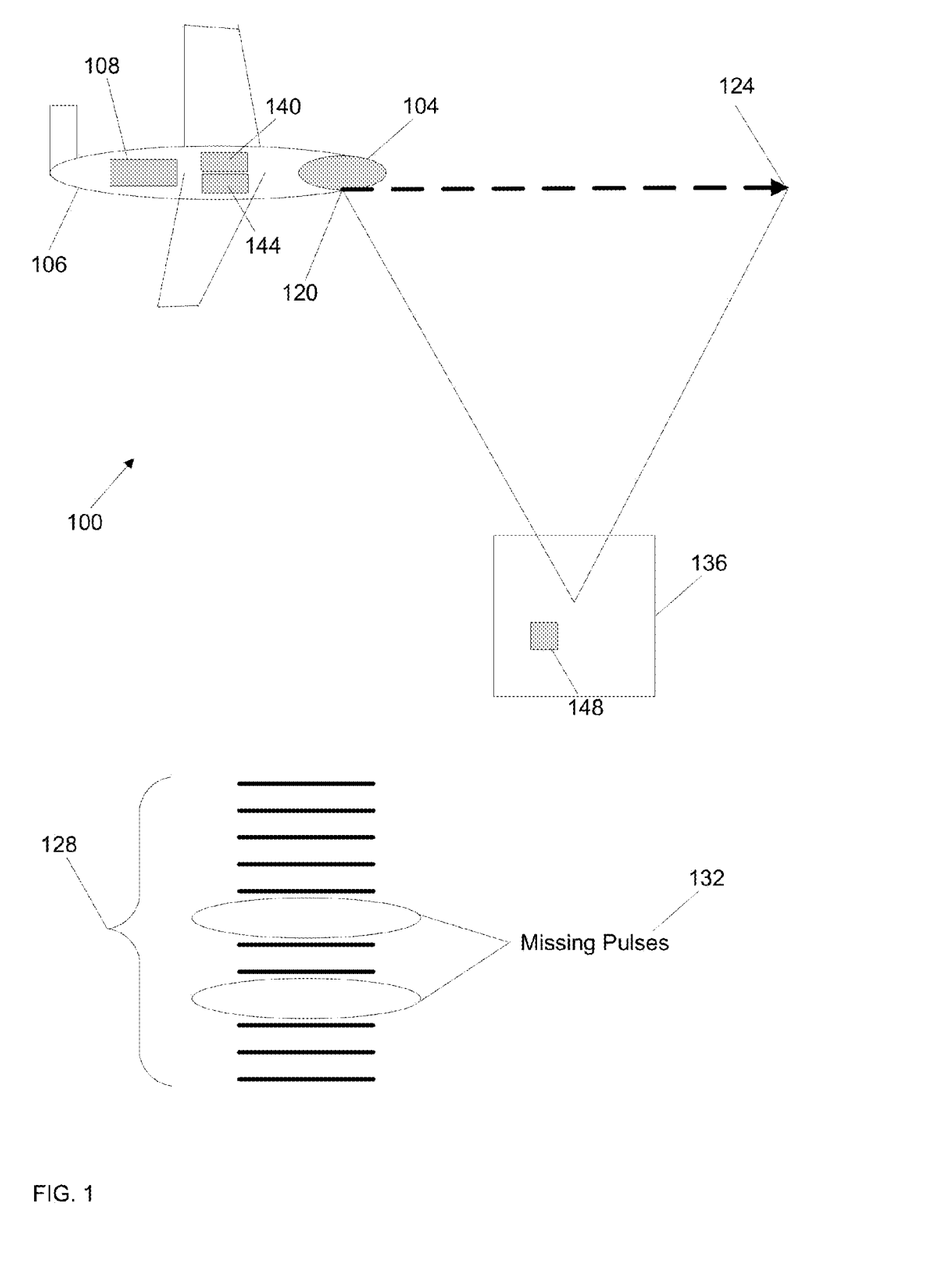
FIG. 1 is a schematic illustration of a SAR system in which a corrupt array of reflected pulses is acquired by the system, according to an illustrative embodiment.

FIG. 1 is a schematic illustration of a SAR system 100 in which a corrupt array of reflected pulses 128 are acquired by the system 100 in an attempt to identify a target 148, according to an illustrative embodiment. In this embodiment, the corrupt array 128 has two missing pulses 132. The SAR system 100 is a moving platform 106 travelling along a trajectory 116. In this embodiment, the moving platform 106 is an aircraft. The moving platform 106 is initially at position 120 and travels along trajectory 116 to position 124. An antenna 104 of the moving platform 106 illuminates patch 136 as the moving platform 106 moves from position 120 to position 124. The antenna 104 illuminates the patch 136 by transmitting radar pulses towards the patch 136 and by receiving corresponding radar return pulses to generate the array 128. Typically a complete array 128 has $2^n$ pulses (e.g., 256, 512, 2048 pulses) to be compatible with Fast Fourier Transform (FFT) processing to be performed on the pulses. The methods and systems described herein repair, bridge, extrapolate or otherwise minimize the effects of the corrupt pulses in the array 128.

Figure 2:
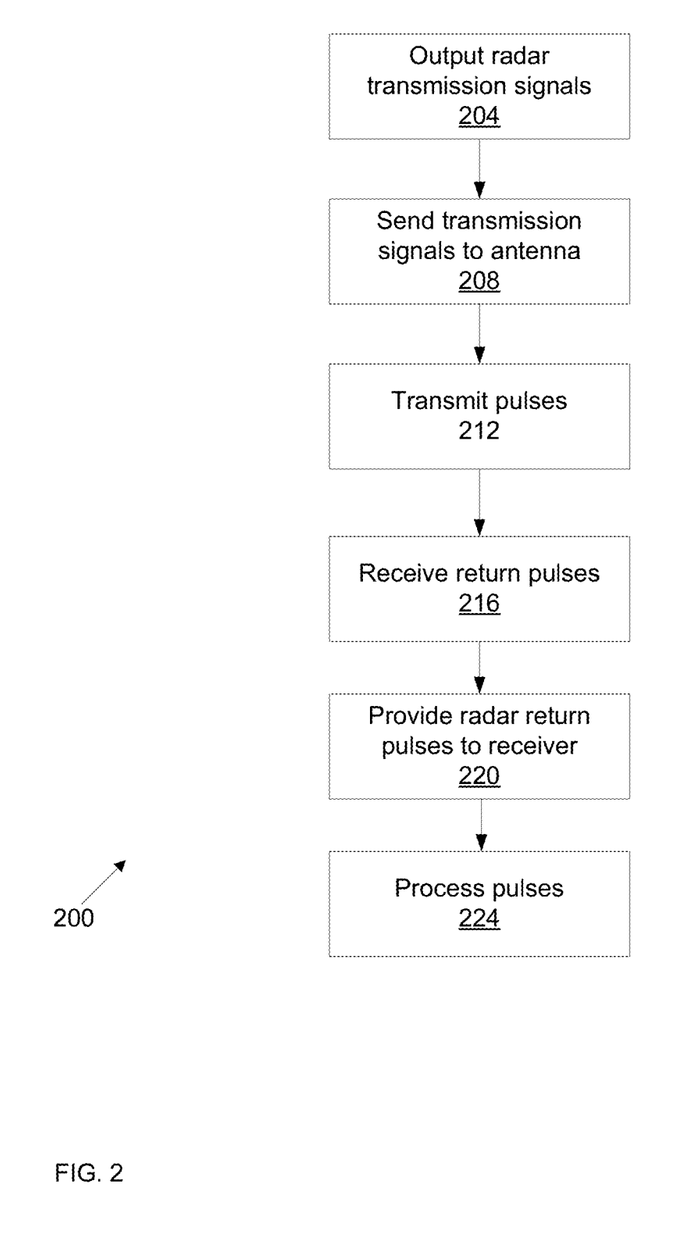
FIG. 2 is a block diagram of operating steps of a SAR system.

The moving platform 106 includes a transmitter 140, a receiver 144, and a controller 108. FIG. 2 is a block diagram 200 of operating steps for a SAR system (e.g., SAR system 100 of FIG. 1). The controller 108 outputs radar transmission signals (step 204) to the transmitter 140 which sends transmission signals (step 208) to the antenna 104 to transmit the radar pulses (step 204). The antenna 104 receives the radar return pulses (step 216) and provides (step 220) the radar return pulses to the receiver 144 which then provides the radar return pulses to the controller 108 for subsequent processing (step 224), for example, for repairing the corrupt pulses in the array 128, as described herein.

Figure 3:
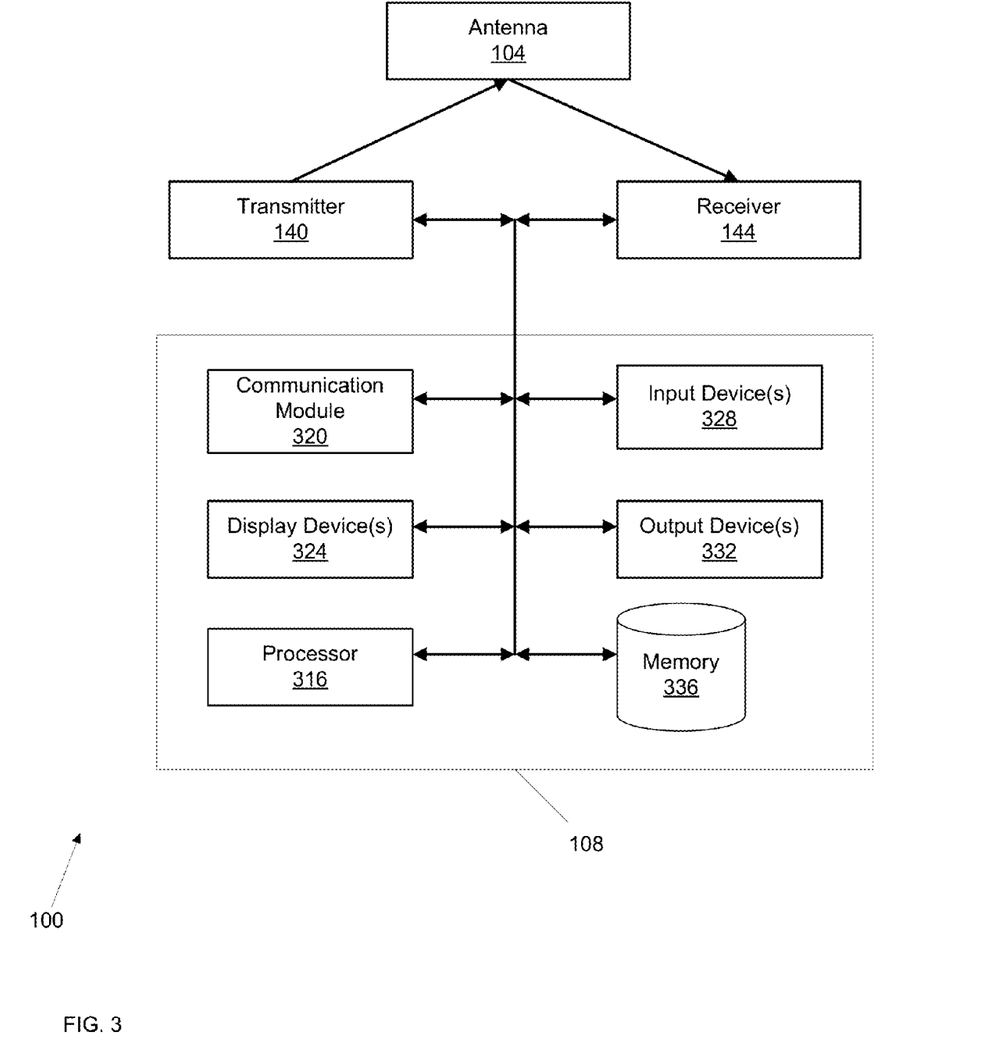
FIG. 3 is a schematic illustration of components of the SAR system, according to an illustrative embodiment.

FIG. 3 is a schematic illustration of components of the SAR system 100 of FIG. 1, according to an illustrative embodiment. The controller 108 includes a communication module 320, one or more input devices 328, one or more output devices 332, one or more display devices(s) 324, one or more processor(s) 316, and memory 336. The modules and devices described herein can, for example, utilize the processor 316 to execute computer executable instructions and/or the modules and devices described herein can, for example, include their own processor to execute computer executable instructions. It should be understood the controller 108 can include, for example, other modules, devices, and/or processors known in the art and/or varieties of the described modules, devices, and/or processors.

The communication module 320 includes circuitry and code corresponding to computer instructions that enable the computing device to send/receive signals to/from the antenna 104 (e.g., antenna 104 of FIGS. 1 and 3). For example, the communication module 320 provides commands from the processor 316 to the transmitter 140 to control how the antenna 104 transmits radar pulses during operation. The communication module 320 also, for example, receives data corresponding to the radar return pulses received by the receiver 144. The received data can be, for example, stored by the memory 336 or otherwise processed by the processor 316.

The input devices 328 receive information from a user (not shown) and/or another computing system (not shown). The input devices 328 can include, for example, a keyboard, a scanner, a microphone, a stylus, a touch sensitive pad or display. The output devices 332 output information associated with the controller 108 (e.g., information to a printer, information to a speaker, information to a display, for example, graphical representations of information). The processor 316 executes the operating system and/or any other computer executable instructions for the controller 108 (e.g., executes applications). The memory 336 stores a variety of information/data, including profiles used by the controller 108 to specify how the system 100 repairs, bridges, extrapolates or otherwise minimizes the effects of the corrupt pulses in the array 128. The memory 336 can include, for example, long-term storage, such as a hard drive, a tape storage device, or flash memory; short-term storage, such as a random access memory, or a graphics memory; and/or any other type of computer readable storage.

Figure 4:
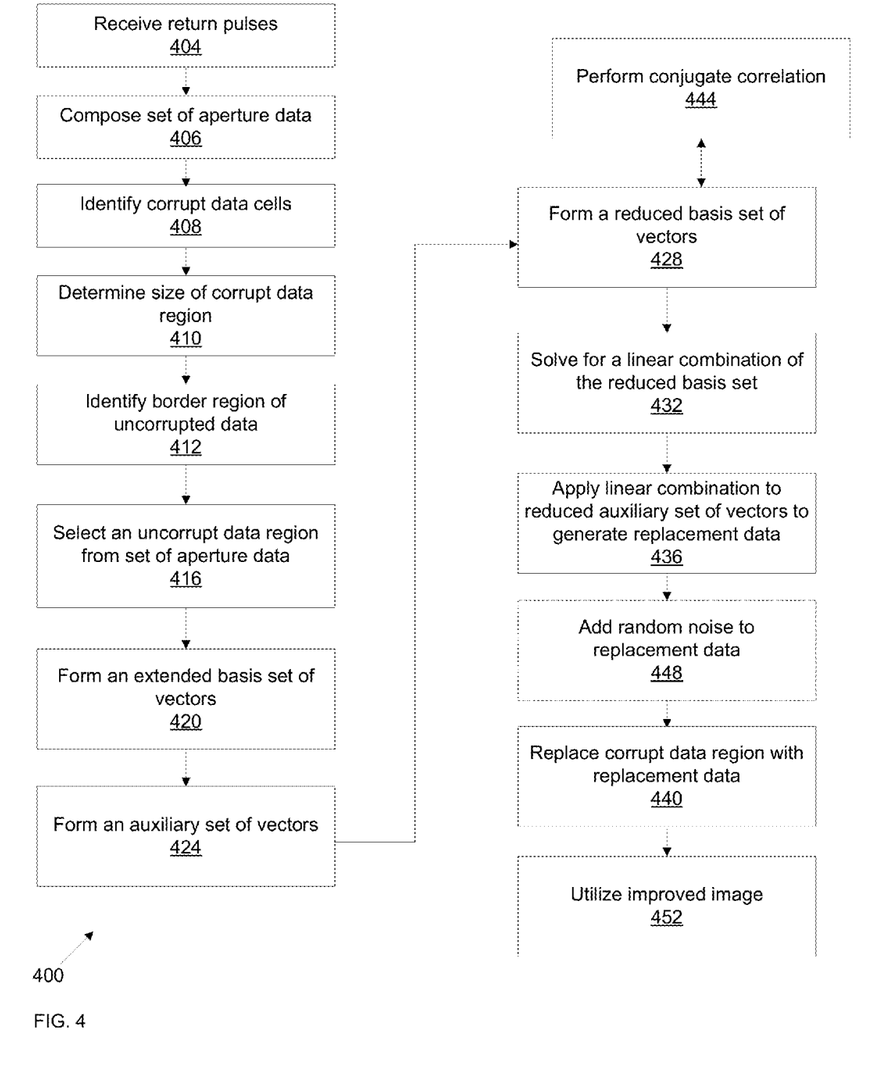
FIG. 4 is a block diagram of a method for repairing, bridging, or extrapolating an existing SAR aperture to improve interpretability, according to an illustrative embodiment.
Figure 5:
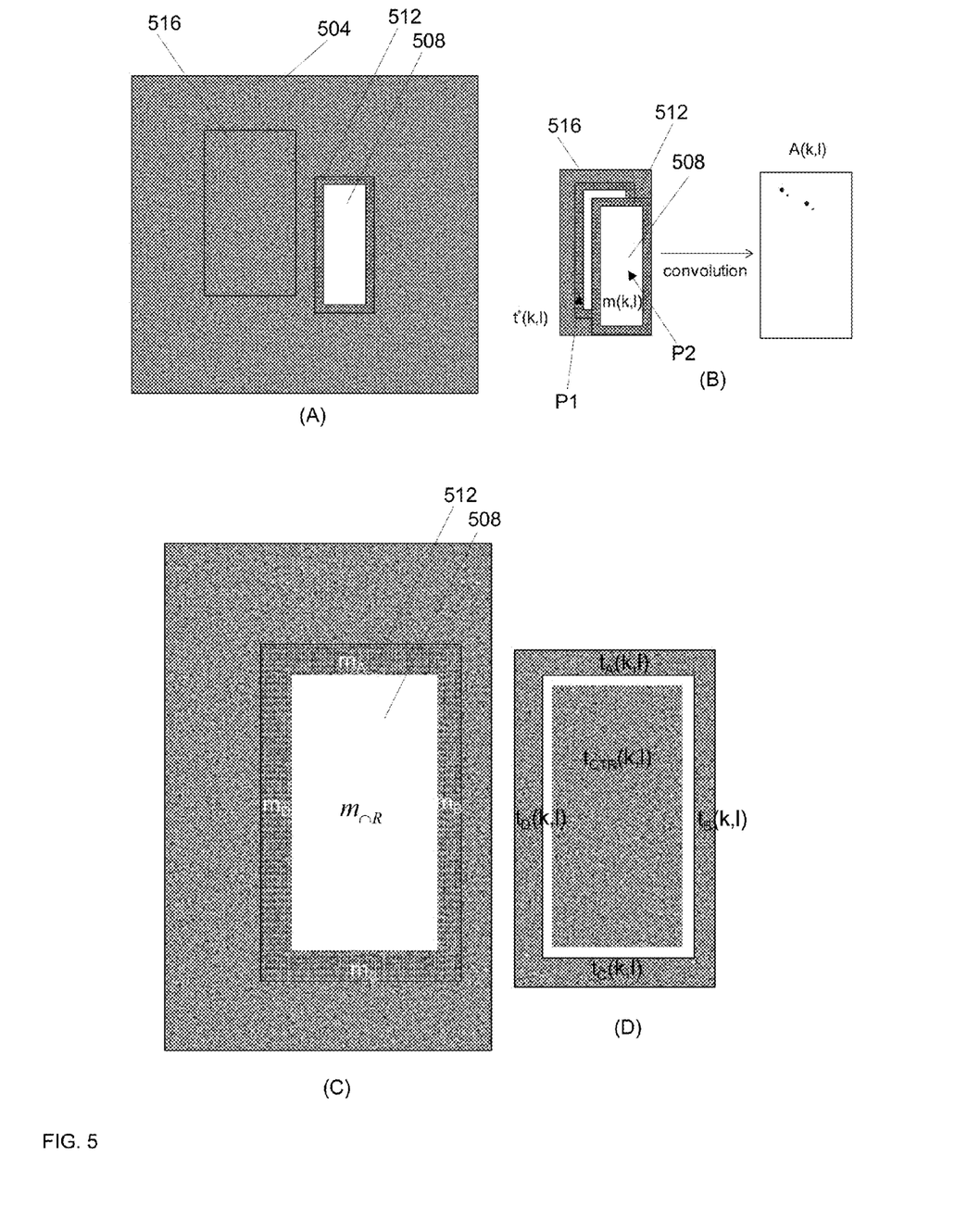
FIG. 5 is a schematic illustration of aperture data, a corrupt data region, and replacement data for fixing the corrupt data region, according to an illustrative embodiment.

FIG. 4 is a block diagram 400 of a method for repairing, bridging, or extrapolating an existing SAR aperture to improve interpretability, according to an illustrative embodiment. FIG. 5 is a schematic illustration of a set of aperture data 504, a corrupt data region 506, and replacement data for fixing the corrupt data region, according to an illustrative embodiment. The method includes receiving return pulses (step 404) from which a set of aperture data 504 is composed (step 406) by, for example, the controller 108 of FIG. The e aperture data is composed by filtering out unwanted signals, and by reformatting the data to support Fourier Transform image formation. 1. The method also includes identifying corrupt data cells 508 in the aperture data (step 408) In some embodiments, corrupt data cells are cells whose aperture data values are not within an expected range of values (e.g., not within a nominal range of values as determined by experimentation or by testing in the field). In some embodiments, corrupt aperture data values are 10×, 20×, or 100× smaller or greater than expected. In other embodiments, corrupt or missing data values are known from other sources, as from the controller when pulses are missing due to a planned interruption, or from another sensor that has detected unwanted interference.

The method also includes determining the size of the corrupt data region 508 (step 410). A corrupt data region 508 is the combination of corrupt data cells that are adjacent or bordering each other. The corrupt data region 508 may be embedded within or may be adjacent to an existing set of aperture data. In this embodiment, the aperture data 504 has one corrupt data region 508. In some embodiments, the aperture data has multiple corrupt data regions to which the steps described herein can be applied. The size of the corrupt data region is subsequently used to identify a region of uncorrupted data that is used for repairing, bridging, or extrapolating the existing aperture to improve the image interpretability.

The method also includes identifying a border region 512 of uncorrupted data (step 412) that is contiguous with the corrupt data region 508. The border region 512 is the region surrounding the corrupt data region 508. The border region can be, for example, a region that is a circumferential ring of data cells surrounding the corrupt data region. The method also includes selecting an uncorrupt data region 516 from the set of existing aperture data (step 416). The uncorrupt data region 516 selected is disjoint from (not overlapping with) the border region 512 and the corrupt data region 508. In addition, the uncorrupt data region 516 is selected to be able to completely overlay the corrupt data region 508 and the border region 512 at multiple translational offsets. (B) illustrates that the uncorrupt data region 516 overlays the corrupt data region 508 for multiple translational offsets (P1, P2 depicted in this embodiment) of the corrupt data region 508. The uncorrupt data region selected exceeds the size of the corrupt data region and the border region to supply the translational degrees of freedom.

The method also includes forming (step 420) an extended basis set of vectors, X, from a one-dimensional mapping of the uncorrupted data registered to each point in the border region, for each translational offset.

The method also includes forming (step 424) an auxiliary set of vectors, A, from a one-dimensional mapping of the uncorrupted data registered to each point in the corrupt data region, for each translational offset.

The method also includes forming (step 428) a reduced basis set of vectors, S. The reduced basis set of vectors is formed, either by 1) picking selected translational offsets of the extended basis set, identified by peaks of a conjugate correlation between the uncorrupted data and the border region, or by 2) picking one or more top eigenvectors of a singular value decomposition (SVD) of the extended basis set, as X=UDV'. U is m×m, with m being the length of the one-dimensional mapping to each point in the border region. D is diagonal and m×n, with n being the number of translational offsets and m>=n. V' is the hermitian conjugate of V, an n×n matrix, and U and V are unitary. The reduced basis set of vectors formed as S=XV$_{top}$, where V$_{top}$ is composed of the columns of V corresponding to the one or more largest diagonal values of D (top eigenvalues). The reduced auxiliary set of vectors formed as S'=AV$_{top}$.

In some embodiments, the conjugate correlation [A(k,l), the result of which is depicted in FIG. 5 (B)] illustrated is performed in accordance with:

$$A(k, l) = \sum_{x=0}^{N-1} \sum_{y=0}^{M-1} M(x, y) \cdot T^*(x, y) \cdot e^{i2\pi k \cdot x/N} \cdot e^{i2\pi l \cdot y/M} \quad \text{EQN. 1}$$

where $$M(x, y) = \frac{1}{MN} \sum_{k'=0}^{N-1} \sum_{l'=0}^{M-1} m(k', l') \cdot e^{-i2\pi k' \cdot x/N} \cdot e^{-i2\pi l' \cdot y/M},$$

$$T(x, y) = \sum_{k'=0}^{N-1} \sum_{l'=0}^{M-1} t(k', l') \cdot e^{-i2\pi k' \cdot x/N} \cdot e^{-i2\pi l' \cdot y/M},$$

m(k',l') is the radar return data for the border region, with zeros for the corrupt data region, t(k',l') is the radar return data for the uncorrupt data region, and M and N are dimensions large enough to allow for overlay of the uncorrupt region with the corrupt data region plus the border region at multiple translational offsets. The method also includes identifying one or more peaks in the conjugate correlation data by finding one or more translational offsets of the data for the uncorrupt data region that have a strong correlation with the border region around the corrupt data region. The peaks in the conjugate correlation are used to identify the translation degrees of freedom for the next step.

The method also includes solving a linear matrix equation (step 432) for the linear combination, C, of the reduced basis set, S, which minimizes the L2-norm distance from the border region (in accordance with EQNS. 2-4). The method also includes applying (step 436, in accordance with EQNS. 4 and 5) the linear combination vector, C, to the reduced auxiliary set of vectors, S', to generate replacement data for replacing the data in the corrupt data region. In some embodiments, random noise is added to the replacement data (optional step 448) to make the replacement data power level consistent with the border region power level. The power of the random noise added to the replacement data is determined by, for example, calculating the average power in the border region and the average power in the replacement data. The difference between the two average powers is then added to the replacement data to make the replacement data power level consistent with the border region power level.

$$S = \begin{bmatrix} \begin{bmatrix} t_A(k_1, l_1) & \ldots & t_A(k_n, l_n) \\ t_B(k_1, l_1) & \ldots & t_B(k_n, l_n) \\ t_C(k_1, l_1) & \ldots & t_C(k_n, l_n) \\ t_D(k_1, l_1) & \ldots & t_D(k_n, l_n) \end{bmatrix} \end{bmatrix} \quad \text{EQN. 2}$$

$$m_{\cap B} = \begin{bmatrix} m_A \\ m_B \\ m_C \\ m_D \end{bmatrix} \quad \text{EQN. 3}$$

$$(S^{T*} \cdot S)C = S^{T*} \cdot m_{\cap B} \quad \text{EQN. 4}$$

$$m_{\cap R} = S' \cdot C \quad \text{EQN. 5}$$

where, $$S' = [t_{ctr}(k_1, l_1) \ldots t_{ctr}(k_n, l_n)] \quad \text{EQN. 6}$$

The method also includes replacing the corrupt data region with the replacement data (step 440) to improve image interpretability of the aperture data. The improved image is then used (step 452) in one of a variety of ways. In some embodiments, the improved image is stored in a memory associated with a SAR image database. In some embodiments, the improved image is used in a targeting system to target one or more object identifiable in the improved image.

The above-described systems and methods can be implemented in digital electronic circuitry, in computer hardware, firmware, and/or software. The implementation can be as a computer program product that is tangibly embodied in non-transitory memory device. The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors, or one or more servers that include one or more processors, that execute a computer program to perform functions of the disclosure by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data. Magnetic disks, magneto-optical disks, or optical disks are examples of such storage devices.

Data transmission and instructions can occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for repairing, bridging, or extrapolating an existing aperture to improve image interpretability; comprising:
   determining a size of a corrupt data region embedded in or adjacent to an existing set of aperture data;
   identifying a border region of uncorrupted data contiguous with the corrupt data region;
   selecting an uncorrupt data region from the set of existing aperture data, disjoint from the border region and the corrupt data region, where the uncorrupt data region is selected to be able to completely overlay the corrupt data region and the border region at multiple translational offsets;

forming an extended basis set of vectors, X, from a one-dimensional mapping of uncorrupted data registered to each point in the border region, for each translational offset;

forming an auxiliary set of vectors, A, from a one-dimensional mapping of uncorrupted data registered to each point in the corrupt data region, for each translational offset;

forming a reduced basis set of vectors, S, either by 1) picking selected translational offsets of the extended basis set, identified by peaks of a conjugate correlation between the uncorrupted data and the border region, or by 2) picking one or more top eigenvectors of a singular value decomposition (SVD) of the extended basis set, as X=UDV', where U is m×m, with m the length of the one-dimensional mapping to each point in the border region, where D is diagonal and m×n, with n the number of translational offsets and m>=n, where V' is the hermitian conjugate of V, an n×n matrix, and U and V are unitary, with the reduced basis set of vectors formed as S=XV$_{top}$, where V$_{top}$ is composed of the columns of V corresponding to the one or more largest diagonal values of D (top eigenvalues), and with the reduced auxiliary set of vectors formed as S'=AV$_{top}$;

solving a linear matrix equation for a linear combination, C, of the reduced basis set, S, which minimizes an L2-norm distance from the border region;

applying the linear combination vector, C, to the reduced auxiliary set of vectors, S', to generate replacement data for replacing the data in the corrupt data region.

2. The method of claim 1, wherein applying the linear combination vector, C, to the reduced auxiliary set of vectors, generates a new data region that best matches the corrupt data region, wherein the step of applying the linear combination vector, C, includes solving a linear matrix equation that minimizes a Euclidean distance at the border region, in accordance with $S^T S \cdot C = S^T \cdot m_{\cap B}$, where S is a matrix of column vectors of the reduced basis set, and $S^T$ is the hermitian conjugate of S, and $m_{\cap B}$ is the one-dimensional mapping of the border region.

3. The method of claim 1, comprising identifying one or more peaks in the conjugate correlation data by finding one or more translational offsets of the data for the uncorrupt data region that have a strong correlation with the border region around the corrupt data region.

4. The method of claim 1, comprising adding random noise to the replacement data to make the replacement data power level consistent with the border region power level.

5. The method of claim 1, wherein the conjugate correlation is performed in accordance with:

$$A(k, l) = \sum_{x=0}^{N-1} \sum_{y=0}^{M-1} M(x, y) \cdot T^*(x, y) \cdot e^{i2\pi k \cdot x/N} \cdot e^{i2\pi l \cdot y/M},$$

where $$M(x, y) = \frac{1}{MN} \sum_{k'=0}^{N-1} \sum_{l'=0}^{M-1} m(k', l') \cdot e^{-i2\pi k' \cdot x/N} \cdot e^{-i2\pi l' \cdot y/M},$$

$$T(x, y) = \sum_{k'=0}^{N-1} \sum_{l'=0}^{M-1} t(k', l') \cdot e^{-i2\pi k' \cdot x/N} \cdot e^{-i2\pi l' \cdot y/M},$$

m(k',l') is the radar return data for the border region, with zeros for the corrupt data region, t(k',l') is the radar return data for the uncorrupt data region, and M and N are dimensions large enough to allow for overlay of the uncorrupt region with the corrupt data region plus the border region at multiple translational offsets.

6. A synthetic aperture imaging system; comprising:

one or more processors; and a memory, the memory including executable code representing instructions that when executed cause the system to:

determine a size of a corrupt data region embedded in or adjacent to an existing set of aperture data;

identify a border region of uncorrupted data contiguous with the corrupt data region;

select an uncorrupt data region from the set of existing aperture data, disjoint from the border region and the corrupt data region, where the uncorrupt data region is selected to be able to completely overlay the corrupt data region and the border region at multiple translational offsets;

form an extended basis set of vectors from a one-dimensional mapping of uncorrupted data registered to each point in the border region, for each translational offset;

form an auxiliary set of vectors from a one-dimensional mapping of uncorrupted data registered to each point in the corrupt data region, for each translational offset;

form a reduced basis set of vectors, S, either by 1) picking selected translational offsets of the extended basis set, identified by peaks of a conjugate correlation between the uncorrupted data and the border region, or by 2) picking one or more top eigenvectors of a singular value decomposition (SVD) of the extended basis set;

form a reduced auxiliary set of vectors, S', either by 1) picking the same selected translational offsets as in S, or by 2) using the same linear combinations of the extended basis set vectors resulting in the one or more top eigenvectors, used in S;

solve a linear matrix equation for a linear combination, C, of the reduced basis set, S, which minimizes an L2-norm distance from the border region;

apply the linear combination vector, C, to the reduced auxiliary set of vectors, S', to generate replacement data for replacing the data in the corrupt data region.

7. The system of claim 6, wherein the memory includes executable code representing instructions that when executed cause the system to solve a linear matrix equation to form a linear combination of the translational degrees of freedom that minimizes a Euclidean distance at the border region to identify which linear combination of the reduced auxiliary set of vectors generates a new data region that best replaces the corrupt data region.

8. The system of claim 6, wherein the memory includes executable code representing instructions that when executed cause the system to identify one or more peaks in the conjugate correlation data that identify translational offsets of the uncorrupt data region that have a strong correlation with the border region.

9. The system of claim 6, wherein the memory includes executable code representing instructions that when executed cause the system to perform a singular value decomposition (SVD) of the extended basis set to identify linear combinations of the vectors of the extended basis set, corresponding to eigenvectors with the greatest magnitude eigenvalues.

10. The system of claim 6, wherein the memory includes executable code representing instructions that when executed cause the system to add random noise to the replacement data to make the replacement data power level consistent with the border region power level.

11. The system of claim 6, comprising a transmitter to transmit radar signals towards a target and a receiver to receive the radar return signals generated in response to the transmitted radar signals, to form the aperture data with a transform relationship to an image.

\* \* \* \* \*